United States Patent [19]

Hartmann

[11] Patent Number: 6,130,936
[45] Date of Patent: Oct. 10, 2000

[54] SYSTEM AND METHOD FOR TERMINATING A TELEPHONE CALL AFTER SIMULATING A TELEPHONE CONNECTION FAILURE

[75] Inventor: Al Hartmann, Round Rock, Tex.

[73] Assignee: Advanced Micro Devices, Inc., Sunnyvale, Calif.

[21] Appl. No.: 08/993,789

[22] Filed: Dec. 19, 1997

[51] Int. Cl.[7] .................................................. H04M 1/56
[52] U.S. Cl. .............................................................. 379/142
[58] Field of Search ..................................... 379/354, 355, 379/142, 93.23, 93.17, 414, 417, 415, 373, 376, 381; 455/414, 415

[56] References Cited

U.S. PATENT DOCUMENTS

| | | |
|---|---|---|
| 4,405,839 | 9/1983 | Groff . |
| 4,480,154 | 10/1984 | Klee . |
| 5,146,491 | 9/1992 | Silver et al. ............................. 379/114 |
| 5,276,731 | 1/1994 | Arbel et al. ............................. 379/142 |
| 5,317,632 | 5/1994 | Ellison . |
| 5,351,285 | 9/1994 | Katz ....................................... 379/142 |
| 5,396,548 | 3/1995 | Bayerl et al. ........................... 379/142 |
| 5,446,785 | 8/1995 | Hirai ...................................... 379/142 |
| 5,546,447 | 8/1996 | Skarbo et al. .......................... 379/142 |
| 5,604,797 | 2/1997 | Adcock . |
| 5,644,629 | 7/1997 | Chow ..................................... 379/142 |
| 5,651,053 | 7/1997 | Mitchell ................................. 379/142 |
| 5,719,450 | 2/1998 | Vora . |
| 5,796,815 | 8/1998 | Guercio et al. ........................ 379/142 |
| 5,812,648 | 9/1998 | Wanner . |
| 5,841,850 | 11/1998 | Fan ......................................... 379/142 |
| 5,850,180 | 12/1998 | Hess . |
| 5,862,113 | 1/1999 | Tsuyuguchi et al. . |
| 5,872,838 | 2/1999 | Huang .................................... 379/142 |
| 5,883,942 | 3/1999 | Lim et al. .............................. 379/142 |
| 5,930,351 | 1/1999 | Lappen et al. . |

*Primary Examiner*—Paul Loomis
*Assistant Examiner*—Rexford N Barnie
*Attorney, Agent, or Firm*—Conley, Rose & Tayon, P.C.

[57] ABSTRACT

The present invention comprises an improved telephone system and method for terminating a telephone call after simulating a telephone connection failure. After establishing a telephone connection, a user can terminate the telephone call by depressing a switch on the telephone. The telephone then receives a signal that the switch has been depressed, generates a sound in the telephone line, and then terminates the telephone call. In one embodiment, the user terminates the telephone call because the user no longer wishes to continue conversing with the caller. In another embodiment, the caller terminates the telephone call before the user answers the telephone call after the user determines the identity of the caller. The generated sound simulates a failure in the telephone connection. For example, the sound could be noise to attempt to persuade the caller that the telephone connection is unusable. Thus, a user can terminate a telephone call without the user giving any explanation to the caller of why the user needs to terminate the telephone call.

11 Claims, 5 Drawing Sheets

SYSTEM AND METHOD FOR TERMINATING A TELEPHONE CALL AFTER SIMULATING A TELEPHONE CONNECTION FAILURE

FIELD OF THE INVENTION

The present invention relates to a telephone system and method for terminating a telephone call after simulating a telephone connection failure.

DESCRIPTION OF THE RELATED ART

Telephone subscribers communicate via a vast telephone network, referred to as the Public Switched Telephone Network (PSTN). In the present disclosure, the term "PSTN" is intended to include the analog telephone network or POTS (Plain Old Telephone Service), ISDN (Integrated Services Digital Network), DSL (Digital Subscriber Line), and Wireless Local Loop (WLL), among others.

A telephone subscriber's communications devices, e.g., telephones, are typically connected in parallel to a telephone line which links a subscriber's premises to a telephone service provider's central office. An ordinary telephone is the most familiar of such communications devices. An ordinary telephone includes a handset, and the handset includes a receiver and a transmitter. The receiver is designed to be placed over a user's ear during use, and the transmitter designed to be positioned in close proximity to the user's mouth during use.

In a POTS system, when the telephone is not in use, the telephone is disconnected from the telephone line, except for a ringer circuit. When a caller places a telephone call to a receiving party, switching equipment in the central office transmits a series of ring signals over the receiving party's telephone line. The ring signals cause the ringer circuit of the receiving party's telephone to generate sounds which alert the receiving party to the incoming telephone call. At the same time, the switching equipment sends a series of ringback signals to the caller to let the caller know that the telephone call is being placed. When the receiving party answers the incoming telephone call, a communication is established between the caller and the receiving party.

Several different types of communications devices are designed to automatically transmit or receive information following detection of one or more ring signals. Examples of such communications devices include telephone answering machines and communications devices equipped with modulator-demodulators (modems). An answering machine typically includes control circuitry which electrically connects a voice message unit to the telephone line after a predetermined number of ring signals are detected, causes the voice message unit to transmit (i.e., play back) a prerecorded outgoing voice message, and then receives and records any incoming voice message transmitted by the caller following transmission of the outgoing voice message. Digital communications devices equipped with modems exchange frequency-encoded information via the telephone network. Facsimile (fax) machines are examples of such digital communications devices. A fax machine typically includes control circuitry which electrically connects a modem to a telephone line after a predetermined number of ring signals are detected, then either transmits or receives frequency-encoded digital information. A modulator portion of a modem within a transmitting fax machine converts a digital value (i.e., a logic one or a logic zero) to a corresponding analog tone. A demodulator portion of a modem within a receiving fax machine performs the opposite function, converting the analog tone to the corresponding digital value.

Telephone service providers also offer "caller ID" services which provide information about a caller. Devices which receive, store, and display digital caller ID information are widely available. The caller ID service is typically available to telephone subscribers for a small additional monthly fee. Under current standards, frequency-encoded digital caller ID information is transmitted between the first and second ring signals. Information about a caller is thus received, stored, and displayed by a caller ID device before a user would normally answer a ringing telephone. Caller ID information is typically recorded by caller ID devices whether the associated telephone is answered or not. Caller ID circuitry may be included as part of a telephone or the caller ID circuitry may be part of a separate box that is also connected to the telephone line.

A telephone system would be desirable that provides the user or the users with additional features for a more effective use of their telephone service. Desirable features could be, for example a feature that would enable the user to discontinue the telephone from ringing without the user answering the telephone call and a feature that would enable a user to terminate a telephone call after simulating a failure of the telephone connection. Such features would enhance the usefulness of a user's telephone service.

SUMMARY OF THE INVENTION

The present invention comprises an improved telephone system with additional features that enable a user or users to make more effective use of their telephone service.

In the first embodiment, the present invention comprises an improved telephone system and method that provide ringer control to a telephone. When the telephone receives an incoming telephone call from a caller, the telephone generates a ring sound to alert a user of the telephone to the incoming telephone call. The present invention allows the user of the telephone to discontinue the telephone from generating a ringer sound without the user answering the incoming telephone call.

In one embodiment, the user depresses or touches a button on the telephone while the telephone is generating a ring sound in order to discontinue the telephone from generating the ring sound. In the preferred embodiment, the button is large in size and located on the front, top surface of the telephone so that the switch is easily accessible by the user.

In another embodiment, the user taps the telephone thereby activating a vibration detector in the telephone. The vibration detector then sends a signal to the telephone to discontinue generating the ring sound. In yet another embodiment, the user triggers a motion detector on the telephone in order for the telephone to discontinue generating the ring sound. The motion detector is preferably located on a top surface of the telephone with an infrared beam that is substantially vertical.

In yet other embodiments, the telephone may comprise a heat sensor or a resistance/capacitance sensor to provide input to the telephone to discontinue generating the ring sound. When the user touches the sensor, the user's body heat or different resistance value trigger the sensor.

In the second embodiment, the present invention comprises an improved telephone system and method for terminating a telephone call after a simulated failure of the telephone connection or other audio message. After establishing a telephone connection, a user can terminate the telephone call by depressing a switch on the telephone. The telephone receives a signal that the switch has been depressed, generates a sound in the telephone line, and then terminates the telephone call. In one embodiment, the user terminates the telephone call because the user no longer wishes to continue conversing with the caller. In another embodiment, the caller terminates the telephone call before the user answers the telephone call after the user determines the identity of the caller.

The generated sound simulates a failure in the telephone connection. For example, the sound could be noise to attempt to persuade the caller that the telephone connection is unusable. Thus, a user can terminate a telephone call without the user explaining to the caller why the user needs to terminate the telephone call.

In one embodiment, after the telephone terminates the telephone call due to user input, the user may enter a numeric code into the telephone instructing the telephone not to accept any telephone calls from the telephone number that has just been disconnected. Since the caller believes that the connection was lost due to a telephone line failure, the caller will think that the current attempt to reach the user is also due to the same line failure.

In another embodiment, the telephone comprises a caller ID unit for determining the identity of the caller for an incoming telephone. After a user determines the identity o the caller using the caller ID unit and before the user answers the telephone call, the user may decide to terminate the telephone call.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

First Embodiment, System and Method for Providing Ringer Control on a Telephone

Figure 1:
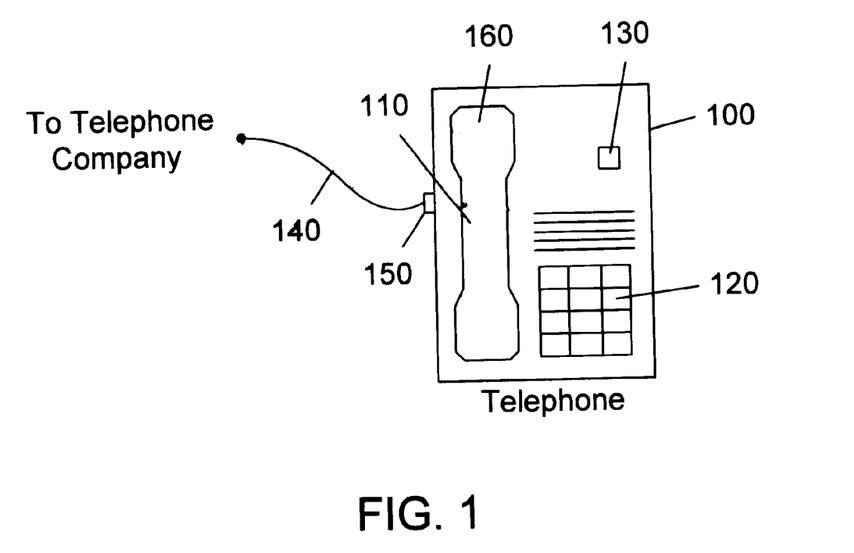
FIG. 1 shows a telephone with improved features and a switch for enabling/disabling the improved features.

In the first embodiment, the present invention comprises an improved telephone system and method for providing ringer control to a telephone. Such a telephone system is shown in FIG. 1. Telephone 100 is connected to the telephone service provider's central office using telephone line 140. Telephone 100 is coupled to telephone line 140 through port 150. Telephone signals are sent and received to and from the central office. As used in the present invention, "telephone" may refer to a conventional analog telephone, a digital telephone, a cordless telephone, or a cellular telephone. Furthermore, the telephone functions may be performed by a computer, a personal digital assistant (PDA), a web surfer, or any other system that has a sub-function that acts like a telephone.

Telephone 100 further comprises handset 110. Handset 110 comprises an earphone for receiving voice signals and generating audible sound and a microphone for transmitting voice over the telephone line. In a POTS network, when the handset is located in the cradle of the telephone 100, the placement and/or weight of the handset 110 maintains hook switch 160 in the open position. Once the handset 100 is picked up by the user, hook switch 160 closes and telephone 100 turns on for placing or answering a call. It is noted that hook switch 160 may be closed by other means, such as the user pressing a "talk" button in the case of a cordless telephone. Furthermore, for an ISDN, DSL, WLL, or other networks, the telephone 100 answers or places a telephone call using means appropriate to that network.

Figure 2:
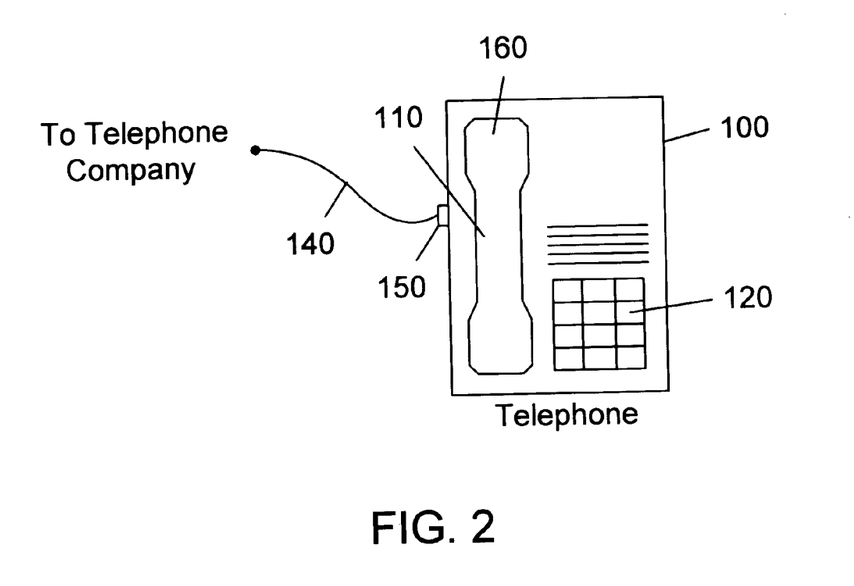
FIG. 2 shows a telephone with improved features.

Telephone 100 includes user input detector 130 which provides the ringer control. As shown in FIG. 1, user input detector 130 comprises a button which the user can depress to provide the ringer control. In other embodiments, ringer control is provided by other means which will also be discussed further below. Such a telephone, without user input detector 130, is shown in FIG. 2.

Figure 3:
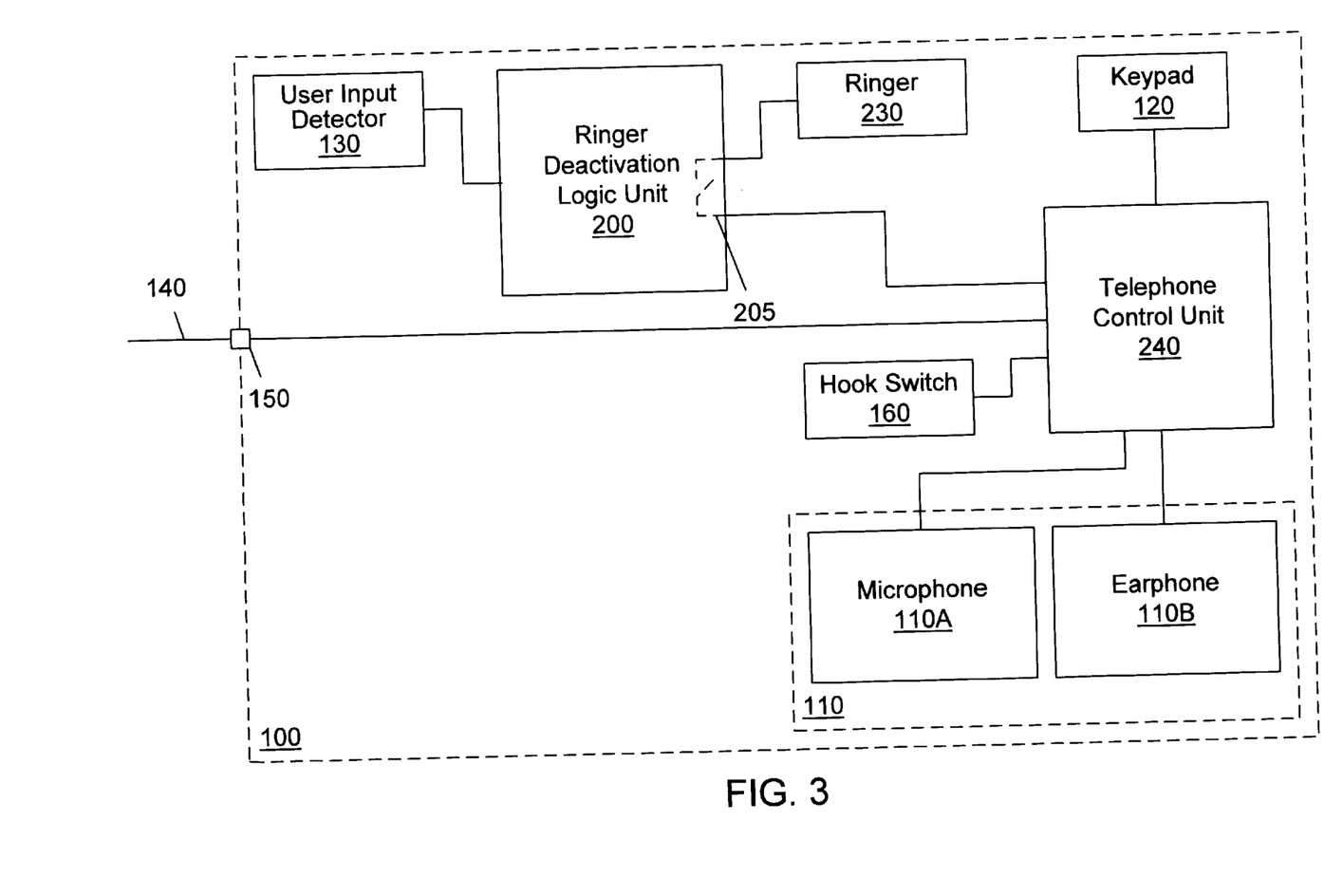
FIG. 3 shows a block diagram of a telephone with ringer control.

FIG. 3 shows a block diagram of telephone system 100. When a caller places a call, a ring signal is transmitted to telephone system 100 through telephone line 140. Telephone control unit 240, which is directly coupled to port 140, first receives the incoming ring signal. Telephone control unit 240 performs regular telephone functions as are well known in the art. Upon receiving a ring signal, telephone control unit 240 sends the ring signal to ringer 230 through ringer-deactivation logic unit 200. In the preferred embodiment, prior to receiving an incoming telephone call, switch 205 is closed which enables the ring signal to be transmitted to ringer 230. Ringer 230 produces an audible ring that alerts the user to the incoming telephone call, which the user can then answer. In a POTS, the user answers the telephone call by lifting handset 110, which closes switch 160 and places the telephone off-hook. For an ISDN, DSL, WLL, or other types of telephone network, the telephone 100 is answered by other means appropriate to the protocol used. The user then transmits voice to the caller by talking into microphone 110A and receives sound by listening to earphone 110B.

The ringer control feature of telephone 100 enables a user of the telephone to discontinue the telephone 100 from generating a ring sound without requiring the user to first answer the telephone 100. This allows the user to be notified of the incoming call, discontinue the telephone 100 from generating the ring sound, and then decide whether to answer the telephone call.

In one embodiment, user input detector 130 comprises a button that the user can depress or touch in order to discontinue telephone 100 from generating a ring sound. Upon receiving an incoming telephone call and while the ringer is generating the ring sound, the user may depress the button. When ringer-deactivation logic unit 200 detects that the button has been depressed, ringer-deactivation logic unit 200 opens switch 205 which breaks the electrical connection between telephone control unit 240 and ringer 230.

In the preferred embodiment, ringer-deactivation logic unit 200 comprises a programmable device, such as a digital signal processor, a central processing unit, a microcontroller, or an FPGA. Ringer-deactivation logic unit 200 may also comprise digital or analog circuitry. Also in the preferred embodiment, the default position for switch 205 is closed, i.e., switch 205 is in the closed position before receiving a telephone call. Thus, even when a user has depressed no-ring switch 130 during an incoming telephone call, switch 205 is reset to the closed position for the next telephone call. In the preferred embodiment, the button is large in size or diameter. Also in the preferred embodiment, switch 205 is located on the front, top surface of the telephone 100 in order for a user to be able to quickly access the switch.

In another embodiment, user input detector 130 comprises a vibration detector which is also coupled to ringer-deactivation logic unit 200. The vibration detector is operable to detect a mechanical vibration and send a signal to ringer-deactivation logic unit 200. In one embodiment, the vibration detector is physically attached to the telephone 100, either to the outside of the telephone 100 or internally. When a user desires to discontinue the telephone 100 from generating a ring sound, the user taps the telephone 100 to generate a mechanical vibration which is then detected by the vibration detector. When the vibration detector detects a mechanical vibration, a signal is sent to ringer-deactivation logic unit 200 which then opens switch 205 to discontinue ringer 230 from generating a ring sound. In one embodiment, the vibration detector further comprises a sensitivity-adjustment knob with which a user can set the sensitivity of the vibration detector.

In yet another embodiment, user input detector 130 comprises a motion detector which is also coupled to ringer-deactivation logic unit 200. The vibration detector is operable to detect a motion caused by a user and send a signal to ringer-deactivation logic unit 200. In one embodiment, the motion detector is physically located on a top surface of the telephone 100 and transmits a beam which is substantially vertical. In one embodiment, the motion detector transmits a weak infrared beam. When a user desires to discontinue the telephone 100 from generating a ring sound, the user, for example, waves his/her hand sufficiently near the motion detector to disrupt the beam transmitted by the motion detector. The motion detector then detects the motion caused by the user and transmits a signal to ringer-deactivation logic unit 200. In response, ringer-deactivation logic unit 200 opens switch 205 to discontinue ringer 230 from generating a ring sound. In one embodiment, the motion detector further comprises a sensitivity-adjustment knob with which a user can set the sensitivity of the vibration detector.

In an alternate embodiment, user input detector 130 comprises a heat/temperature sensor. In this embodiment, the user may touch a thermocouple on telephone 100 in order to discontinue the telephone from generating a ring sound. The thermocouple detects the user input by measuring the higher temperature of the human body.

In yet another alternate embodiment, user input detector 130 comprises a resistance, inductance, or capacitance sensor. In this embodiment, the user may touch an electrical conductor on telephone 100 in order to discontinue the telephone from generating a ring sound. The electrical conductor is coupled to an electrical circuit which is operable to detect changes in resistance, inductance, or capacitance caused by the user touching the electrical conductor.

Figure 4:
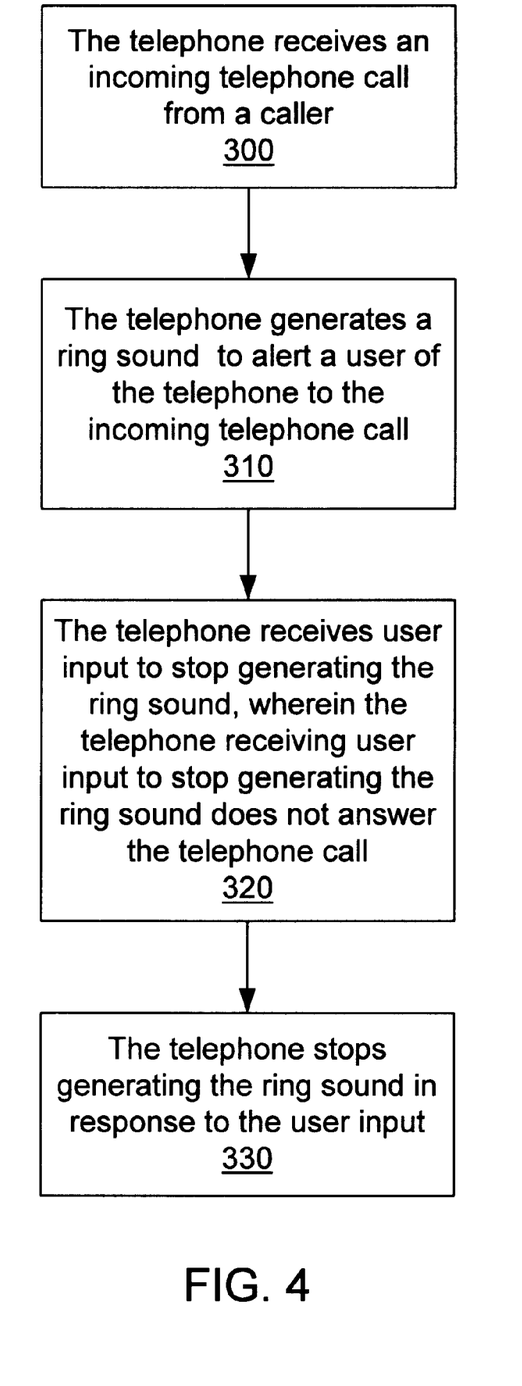
FIG. 4 shows a flowchart describing a method for controlling the ringer of a telephone.

The flowchart of FIG. 4 describes a method for providing ringer control to a telephone. In step 300, the telephone 100 receives an incoming telephone call from a caller. The telephone 100 receives the incoming telephone call, and in step 310 the telephone generates a ring sound to alert a user of the telephone to the incoming telephone call.

In step 320, the telephone 100 receives user input to discontinue generating a ring sound, wherein the telephone 100 receiving user input to discontinue generating a ring sound does not answer the telephone call. In one embodiment, the user depresses a button on the telephone 100 while the telephone 100 is generating a ring sound in order to discontinue the telephone from generating the ring sound. In another embodiment, the user taps the telephone thereby activating a vibration detector in the telephone. The vibration detector then sends a signal to the telephone to discontinue generating the ring sound. In yet another embodiment, the user triggers a motion detector on the telephone in order for the telephone to discontinue generating the ring sound. The motion detector is preferably located on a top surface of the telephone with an infrared beam that is substantially vertical. In response to the user input, in step 330, the telephone discontinues generating the ring sound without answering the telephone call.

In an alternate embodiment, user input detector 130 comprises a heat/temperature sensor. In this embodiment, the user may touch a thermocouple on telephone 100 in order to discontinue the telephone from generating a ring sound. The thermocouple detects the user input by measuring the higher temperature of the human body.

In yet another alternate embodiment, user input detector 130 comprises a resistance, inductance, or capacitance sensor. In this embodiment, the user may touch an electrical conductor on telephone 100 in order to discontinue the telephone from generating a ring sound. The electrical conductor is coupled to an electrical circuit which is operable to detect changes in resistance, inductance, or capacitance caused by the user touching the electrical conductor.

Second Embodiment, System and Method for Terminating a Telephone Call

In the second embodiment, the present invention comprises an improved telephone system that receives user input to terminate a telephone call after simulating a failure of the telephone line. Such a telephone system is shown in FIG. 1. In this embodiment, switch 130 is used for activating the telephone call-termination feature. As described above, the feature may also be activated by a computer connected to the telephone. As used in the present invention, "telephone" may refer to a conventional telephone, a digital telephone, cordless telephone, or a cellular telephone. Furthermore, the telephone functions may be performed by a computer, a PDA, a web surfer, or any other system that has a sub-function that acts like a classic telephone.

Figure 5:
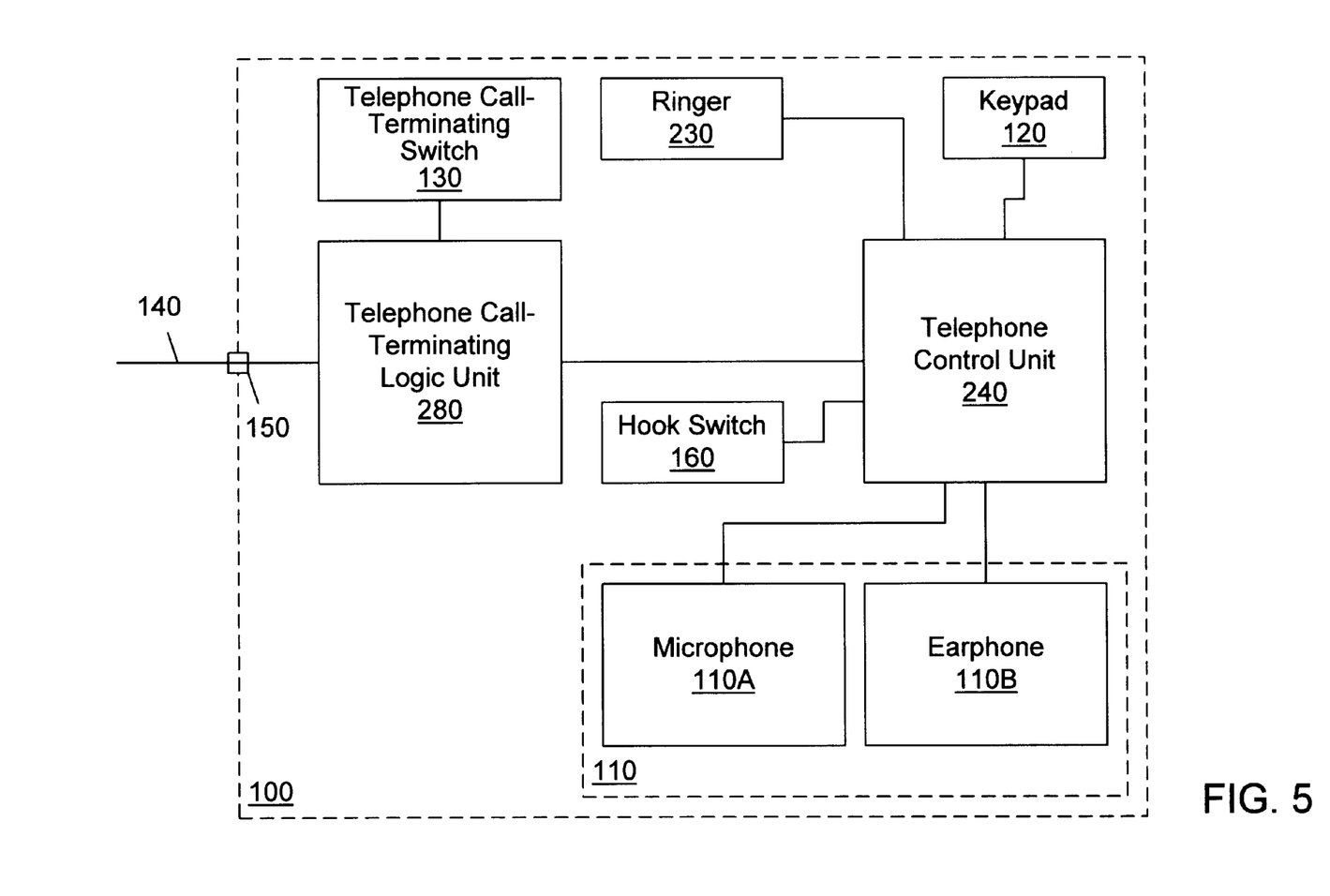
FIG. 5 shows a block diagram of a telephone which enables a user to terminate a telephone call.

FIG. 5 shows a block diagram of telephone system 100. When a caller places a call, a ring signal is transmitted to telephone system 100 through telephone line 140. Telephone control unit 240 first receives the incoming ring signal. Telephone call-terminating logic unit 280 initially allows the ring signal to be originally transmitted to telephone control unit 240. Telephone control unit 240 performs regular telephone functions as are well known in the art. Upon receiving a ring signal, telephone control unit 240 sends the ring signal to ringer 230 through ringer-deactivation logic unit 200. Ringer 230 produces an audible ring that alerts the user to the incoming telephone call, which the user can then answer. In a POTS, the user answers the telephone call by lifting handset 110, which closes switch 160 and places the telephone 100 off-hook. For an ISDN, DSL, WLL, or other types of telephone network, the telephone 100 is answered by other means appropriate to the protocol used. The user then transmits voice to the caller by talking into microphone 110A and receives sound by listening to earphone 110B.

If a user, for whatever reason, wishes to terminate the existing telephone call, the user can depress telephone call-terminating switch 130. Telephone call-terminating logic unit 280 is operable to receive a signal from telephone call-terminating switch 130 and terminate the telephone call. In one embodiment, the user terminates the telephone call because the user no longer wishes to continue conversing with the caller. In another embodiment, the caller terminates the telephone call before the user answers the telephone call after the user determines the identity of the caller.

After receiving user input to terminate the telephone call, telephone call-terminating logic unit 280 generates a sound on the telephone line that simulates a failure in the telephone connection and then terminates the telephone call. For example, the sound could be noise in an attempt to persuade the caller that the telephone connection is unusable. Thus, a user can terminate a telephone call without the user giving explanation to the caller of why the user needs to terminate the telephone call.

Alternatively, for humor purposes, or for disconnecting telemarketers, telephone call-terminating logic unit 280 could play a WAV file or other audio file comprising prerecorded audio sequence. The message, for example, could be: "Please do not call this telephone number again. We are not interested."

In one embodiment, after telephone call-terminating logic unit 280 terminates a telephone call due to user input, the user may enter a numeric code into the telephone 100 instructing the telephone 100 not to accept any more telephone calls originating from the telephone number that has just been disconnected. Alternatively, the user could enable the answering machine with zero rings before answering. Since the caller believes that the connection was lost due to a telephone line failure, the caller will think that the current attempt to reach the user is also due to the same line failure. Thus, a user is prevented receiving undesired telephone calls without the caller knowing.

In another embodiment, the telephone 100 comprises a caller ID unit for determining the identity of the caller for an incoming telephone call. After a user determines the identity o the caller using the caller ID unit and before the user answers the telephone call, the user may decide to terminate the telephone call by depressing telephone call-terminating switch 130.

Figure 6:
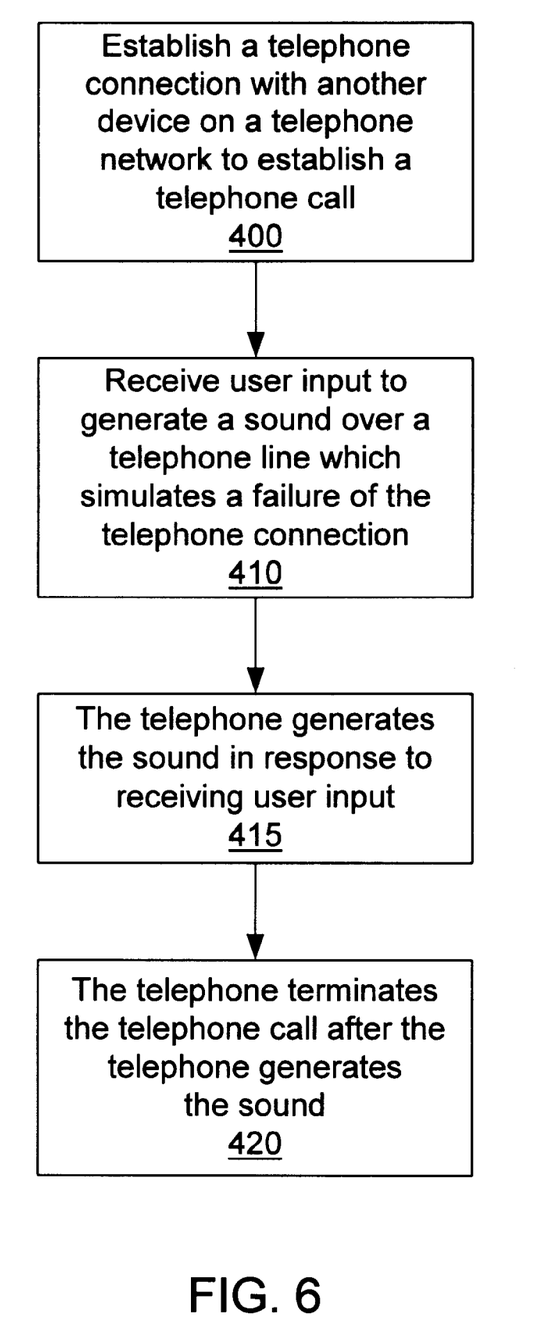
FIG. 6 shows a flowchart describing a method for terminating a telephone call.

The flowchart of FIG. 6 describes the method for receiving user input to terminate a telephone call after a simulated failure of the telephone connection. In step 400, the a telephone connection is established with another device on a telephone network in order to establish a telephone call. For example, an incoming telephone call may be received by the caller. In step 410, the telephone receives user input to generate a sound over the telephone line, and in step 415, the telephone generates the sound in response to the user input. In step 420, the telephone terminates the telephone call. The generated sound simulates a failure of the telephone connection to attempt to persuade the caller that the telephone call was terminated due to an unusable connection.

I claim:

1. A method for terminating a telephone call, the method comprising:

a telephone with a handset on hook receiving an incoming telephone call from a caller;

generating a ring sound to alert a user to the incoming telephone call, wherein said generating is performed in response to said receiving said incoming telephone call;

receiving user input to discontinue generating said ring sound, wherein said receiving said user input to discontinue generating said ring sound occurs prior to answering the incoming telephone call, wherein answering the incoming telephone call comprises taking the handset off hook;

discontinuing generating said ring sound in response to said user input to discontinue generating said ring sound, wherein said discontinuing occurs prior to answering the incoming telephone call;

determining an identity of said caller from caller ID information received as part of said incoming telephone call prior to answering said incoming call;

providing through a display said identity of said caller to said user;

receiving user input to generate a disconnect sound signal and terminate the incoming telephone call in response to said user determining said identity of said caller after viewing said display;

transmitting said disconnect sound signal over a telephone line conveying said telephone call, wherein said disconnect sound signal simulates a failure of a telephone connection between said caller and said user; and terminating said incoming telephone call after generating said disconnect sound signal.

2. The method of claim 1, wherein said incoming telephone call is received over a public switched telephone network (PSTN).

3. The method of claim 1, wherein said generating said disconnect sound signal comprises generating a noise signal which simulates an unusable telephone connection.

4. The method of claim 1, wherein said generating said disconnect sound signal comprises executing a computer audio file that comprises a message telling the caller that the caller's telephone call is refused.

5. A telephone which enables a user to terminate a telephone call, the telephone comprising:

a port for coupling to a telephone line for sending and receiving telephone signals to establish a telephone connection;

a telephone call-terminating logic unit coupled to said port and configured to transmit thereto and to receive therefrom said telephone signals, wherein said telephone call-terminating logic unit is operable to receive user input to generate a sound signal, wherein the telephone call-terminating logic unit is operable to generate the sound signal, wherein the sound signal is transmitted over the telephone line, wherein the sound signal simulates a failure of the telephone connection and further wherein the telephone call-terminating logic unit is operable to terminate the telephone call after the telephone call-terminating logic unit transmits the sound signal;

a ringer deactivation logic unit configured to provide ringer control for an incoming telephone call, wherein said ringer deactivation logic unit is operable to receive user input to discontinue generation of ring sound prior to answering the incoming telephone call; and a switch coupled to said ringer deactivation logic unit and to said telephone call-terminating logic unit, wherein said switch is configured to receive and transfer said user input to generate said sound signal to said telephone call-terminating logic unit, and wherein said switch is further configured to receive and transfer said user input to discontinue said generation of said ring sound to said ringer deactivation logic unit.

6. The telephone of claim 5, wherein the telephone is on the public switched telephone network (PSTN).

7. The telephone of claim 5, wherein the telephone further comprises a caller ID unit, wherein the caller ID unit is operable to:

determine an identity of the caller after establishing the telephone connection; and display the identity of the caller to the user.

8. The telephone of claim 7, wherein the identity of the caller is used by the user to determine whether to terminate the telephone call.

9. The telephone of claim 5, wherein the sound signal generated comprises a noise signal which simulates an unusable telephone connection.

10. A method for terminating a telephone call, the method comprising:

a telephone with a handset on hook receiving an incoming telephone call from a caller;

generating a ring sound to alert a user to the incoming telephone call, wherein said generating is performed in response to said receiving said incoming telephone call;

receiving user input to discontinue generating said ring sound, wherein said receiving said user input to discontinue generating said ring sound occurs prior to answering the incoming telephone call, wherein answering the incoming telephone call comprises taking the handset off hook;

discontinuing generating said ring sound in response to said user input to discontinue generating said ring sound, wherein said discontinuing occurs prior to answering the incoming telephone call;

determining an identity of said caller from caller ID information received as part of said incoming telephone call prior without answering said incoming call;

providing through a display said identity of said caller to said user;

said user initiating a telephone conversation after viewing through said display said identity of said caller;

receiving user input to generate a disconnect sound signal and terminate the incoming telephone call during said telephone conversation;

generating said disconnect sound signal over a telephone line carrying said telephone conversation, wherein said disconnect sound signal simulates a failure of a telephone connection between said caller and said user; and terminating said incoming telephone call after generating said disconnect sound signal.

11. The method of claim 10, wherein said generating said disconnect sound signal comprises a generating noise signal which simulates an unusable telephone connection.

\* \* \* \* \*